United States Patent [19]
Panter et al.

[11] Patent Number: 5,920,386
[45] Date of Patent: Jul. 6, 1999

[54] SUPPORT FRAME FOR HEADLIGHT AIMING APPARATUS

[75] Inventors: Ronald L. Panter, Flushing; John J. Taylor, Flint, both of Mich.

[73] Assignees: Progressive Tool & Industries Co., Southfield; Panter Master Controls, Inc., Mt. Morris, both of Mich.

[21] Appl. No.: 08/890,109

[22] Filed: Jul. 9, 1997

Related U.S. Application Data

[62] Division of application No. 08/699,521, Sep. 4, 1996.

[51] Int. Cl.[6] .................................................. G01J 1/00
[52] U.S. Cl. ............................................................ 356/121
[58] Field of Search ................................ 356/121; 33/288

[56] References Cited

U.S. PATENT DOCUMENTS

| | | | |
|---|---|---|---|
| 3,515,483 | 6/1970 | Irwin | 356/121 |
| 3,532,433 | 10/1970 | Hopkins et al. . | |
| 3,841,759 | 10/1974 | Turner . | |
| 4,134,680 | 1/1979 | Hunter et al. | 356/121 |
| 4,634,275 | 1/1987 | Yoshida et al. . | |
| 4,679,935 | 7/1987 | Fukuda et al. . | |
| 4,907,877 | 3/1990 | Fukuda et al. . | |
| 4,948,249 | 8/1990 | Hopkins et al. . | |
| 5,078,490 | 1/1992 | Oldweiler et al. . | |
| 5,164,785 | 11/1992 | Hopkins et al. . | |
| 5,331,393 | 7/1994 | Hopkins et al. . | |
| 5,373,357 | 12/1994 | Hopkins . | |
| 5,379,104 | 1/1995 | Takao . | |
| 5,392,111 | 2/1995 | Murata et al. . | |
| 5,426,500 | 6/1995 | Ohana . | |

*Primary Examiner*—Robert Kim
*Assistant Examiner*—Amanda Merlino
*Attorney, Agent, or Firm*—Young & Basile, P.C.

[57] ABSTRACT

An apparatus and method for aiming a vehicle headlight to a standard image pattern includes a frame movable relative to the vehicle. A housing carried on a vertically adjustable housing includes a lens focusing a headlight beam onto a reflective screen which reflects the beam image to a camera. A control compares the digitized image output from the camera with a standard image pattern and generates a correlation factor based on the difference between the reflected image and a standard image. Based on the difference, the control generates output signals to an adjustment device engagable with the headlight mounting frame to adjust the position of the mounting frame to reduce the difference to zero.

22 Claims, 9 Drawing Sheets

SUPPORT FRAME FOR HEADLIGHT AIMING APPARATUS

This application is a division of application Ser. No. 08/699,521, filed on Sep. 4, 1996.

BACKGROUND OF THE INVENTION

1. Field of the Invention

The present invention relates, in general, to vehicle headlight aiming apparatus and methods.

2. Description of the Art

Vehicle headlights project a light beam forward of a vehicle to illuminate the roadway for a driver. High beam and low beam headlights either in separate light bulbs or implemented by dual filaments and lens in a single bulb project different light patterns.

Headlights must be aimed according to standards, such as an SAE standard in the United States and different but similar standards in Europe and Japan. Typically, a light beam is projected onto a target board set 25 feet in front of the vehicle. An ideal light beam pattern or image imprinted on the target board is manually compared with the light beam image or pattern from the vehicle and manual adjustments, as necessary, made to the headlight support structure to properly coincide the headlight beam pattern with the standard image pattern.

Another method utilizes the reflection of a light beam from a vehicle headlight through a lens and off of a screen to a camera which produces a digitized image of the reflected light beam. The focal length of the lens and the distance between the lens and the screen are optically equivalent to the 25 foot distance between the headlight and target board described above. The digitized image is then analyzed by an algorithm executed by a processor to locate the highest intensity pattern or "hot spot" which is considered to be the main optical axis of the headlight. The headlight is adjusted, as necessary, to align the hot spot with the hot spot of a properly aligned headlight according to the various standards.

Different aiming algorithms are necessary since the intensity contours of different style lamps varies by the particular market. Both left hand and right hand headlight algorithms are also needed. Typically, however, these algorithms are very sensitive to hardware noise and require additional processing to remove "aim bounce" which has the effect of reporting varying aimpoint values during static repeatability testing.

Since all headlights including both low and high beam lights in each vehicle made in a manufacturing plant must be properly aimed, consideration must be taken as to the integration of the headlight aiming procedure in the typically high speed production line. Due to high production rates, vehicles have been directed to a plurality of individual headlight aiming stations. The multitude of stations adds expense to the aiming operation and may introduce variability in the aiming results between the different stations. Other aiming apparatus, which have been incorporated directly into the production line, must be moved into a position in front of each vehicle at the proper time. This has met with problems in repeatably aligning the headlight aiming apparatus with each vehicle.

Thus, it would be desirable to provide a headlight aiming apparatus and method which utilizes an improved algorithm for greater aiming accuracy. It would also be desirable to provide a headlight aiming apparatus and method which is usable with a plurality of different headlight image patterns. It would also be desirable to provide a headlight aiming apparatus which can be easily integrated into a vehicle assembly line.

SUMMARY OF THE INVENTION

The present invention is an aiming apparatus suitable for aiming a vehicle headlight mounted in an adjustable frame on a vehicle to a standard or reference aiming pattern.

The headlight aiming apparatus of the present invention includes a housing having a focusing lens mounted in one side. A screen is mounted in the housing and spaced from the lens at a prescribed distance to focus a headlight pattern image striking the lens on the screen where it is reflected to an image sensing means mounted in the housing and spaced from the screen. The image sensing means senses the reflected headlight image.

Means are coupled to or formed as a part of the image sensing means for converting the sensed image to digital image representations which are output to a processor means. A memory means is disposed in data communication with the processor means and stores standard image patterns of properly aimed headlights. The processor means is responsive to the output of the image converting means and the standard headlight aiming patterns stored in the memory means for determining differences between a reflected headlight pattern sensed and output from the converting means and a reference pattern stored in memory. In response to any determined differences, the processor means generates correction signals which are supplied to an adjusting means, such as a power driven screwdriver engagable with the headlight aiming frame on the vehicle. The adjusting means is responsive to the correction signals for adjusting the position of the headlight mounting frame to bring the headlight pattern in substantial alignment with standard headlight reference patterns.

Preferably, the processing means forms a sample window of pixels in the digitized image and the model image and multiplies the grayscale intensity values of identical pixels in each image. The products are summed to generate a correlation value for the sample window. Since several sample windows are then formed, each offset from other sample windows and the product and summation steps are repeated to locate a sample window with the highest correlation value. The center of this sample window is determined by the difference in the X and Y axis from the center of the model image. In response to the difference, the processor means generates a signal to drive the adjusting means in a direction to reduce the difference to zero.

In a preferred embodiment, a frame is disposed transversely to a longitudinal axis of a vehicle. Means are provided for movably mounting the housing on the frame for movement between a home position and an aiming position.

Optionally, means are mounted on the frame for calibrating the home position of the housing each time the housing moves to the home position. Preferably, the calibrating means comprises a correctly aimed headlight or a laser mounted on the frame generating a light beam coinciding with the hot spot of a properly aimed headlight.

The memory means also stores X and Y axis position signals for the moving means. Means, coordinating with the particular vehicle, are used to select the X and Y positions of the moving means to repeatably position the housing in the proper aiming position for each headlight on each vehicle or vehicles.

Means are also provided for varying the speed of rotation of the adjusting means in proportion to the magnitude of the difference between the reflected headlight pattern and the stored reference pattern on a pixel-by-pixel basis. Preferably, pulse width modulated drive means, responsive to the output signal from the processor means, controls to the adjusting means to vary the frequency of electrical power supplied to the adjusting means.

The present invention also defines a method for aiming a vehicle headlight to a standard or reference aiming image pattern. The method comprises the steps of:

focusing a light beam from a vehicle headlight onto a reflective surface; sensing the intensity of the reflected light beam from the surface on a pixel-by-pixel basis in a matrix of pixels; forming a sample window matrix of pixels, multiplying the grayscale value of each pixel in the sample window with the value of the corresponding pixel in the model image, summing all of the products for each sample window to form a correlation value, forming consecutive sample windows offset from each other, forming a correlation value for each sample window determining the center along X and Y axes of the sample window using the highest correlation value; determining difference between the center of the sample window with the highest correlation and the center of the model image in at least one axis; and activating an adjustment means engagable with a headlight mounting frame to adjust the headlight position in at least one axis to reduce the difference to zero.

The headlight aiming apparatus and method of the present invention provides a highly accurate aiming process which eliminates certain of the problems when encountered with previously devised vehicle headlight aiming apparatus. The present apparatus is capable of storing many different headlight aiming patterns or images thereby enabling the apparatus to be used in multiple applications or in a single production line for many different style vehicles. The present apparatus is also easily integrated into a vehicle production line without requiring multiple aiming stations.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
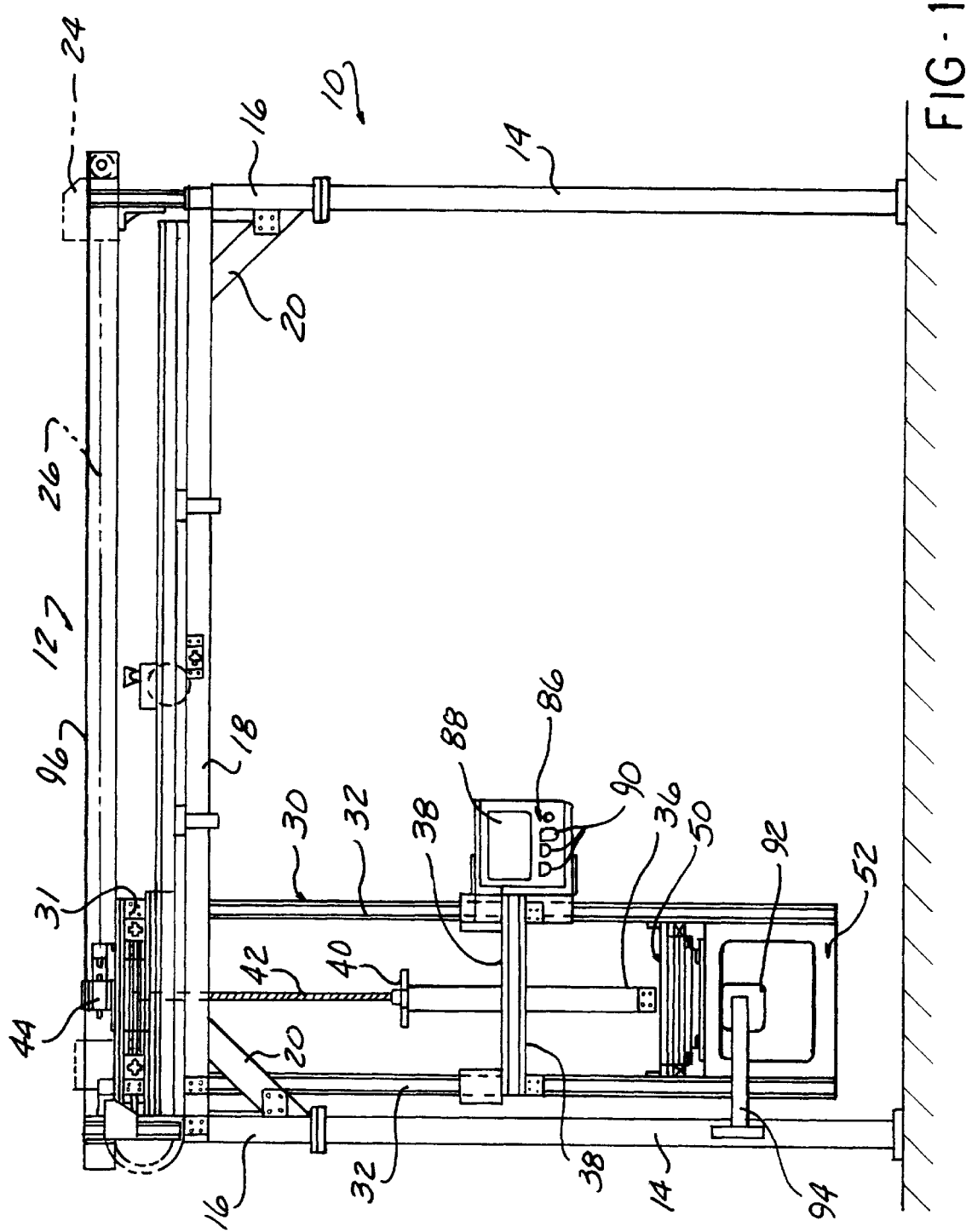
FIG. 1 is a front elevational view of a headlight aiming apparatus constructed in accordance of the teachings of the present invention.
Figure 2:
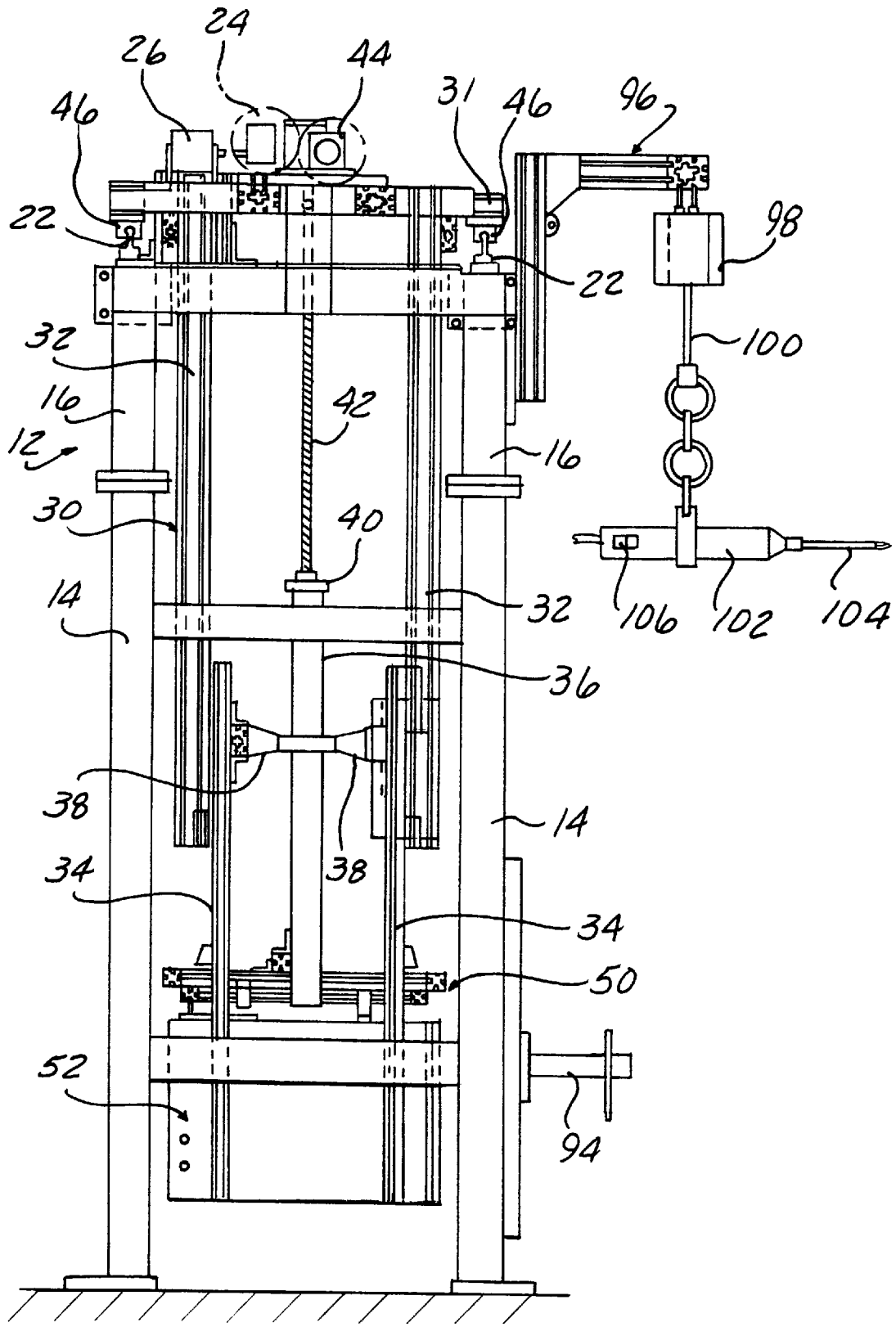
FIG. 2 is a left side elevational view of the apparatus shown in FIG. 1.
Figure 3:
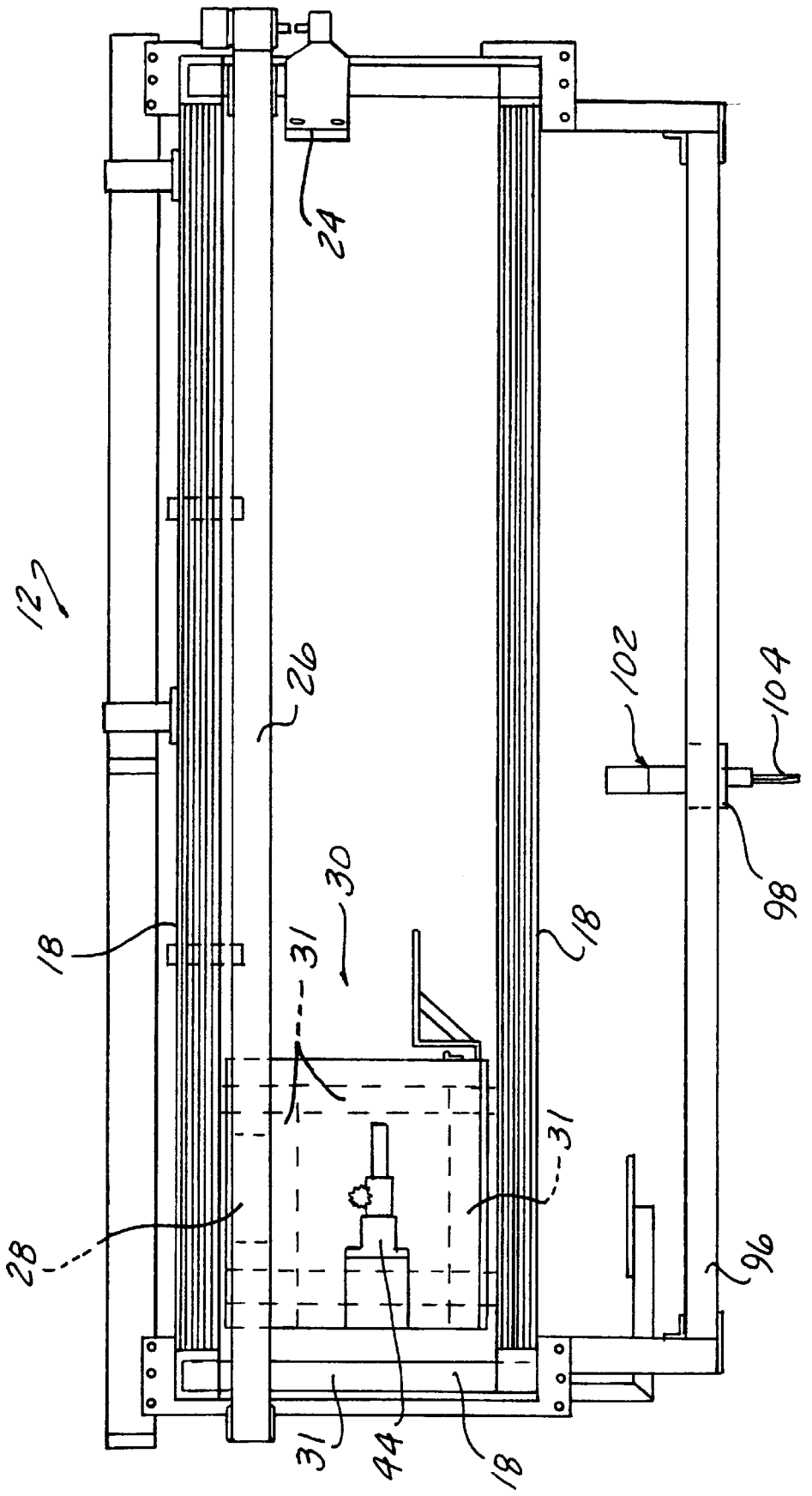
FIG. 3 is a plan view of the apparatus shown in FIG. 1.

Referring now to the drawing, and to FIGS. 1–3 in particular, there is depicted a vehicle headlight aiming apparatus 10. The apparatus 10 includes means for moving a reflected light beam detecting means or camera into position in front of a vehicle headlight. Preferably, the moving means includes a gantry 12 which is positioned transverse to the longitudinal axis of a vehicle located adjacent to the gantry 12. The gantry 12 includes a lower frame formed of a plurality of vertically extending legs 14 which are securely mounted at one end to a floor surface.

An upper frame is formed of four vertically extending legs 16 each of which is joined at one end to one of the legs 14 of the lower frame. Four generally horizontally extending, interconnected tubular members, each denoted by reference number 18 are fixed to the vertical legs 16. Angular braces 20 extend between each vertical leg 16 and an adjacent horizontal leg 18. As shown in FIG. 2, a pair of horizontally extending slide rails 22 are mounted on two of the horizontal tubular members 18 of the upper frame.

As shown in FIGS. 1 and 2, a movable mounting rack denoted by reference number 30 is movably mounted for horizontal movement along the tubular members 18. The movable rack 30 includes an upper frame structure formed of four interconnected tubular members generally connected in a square or rectangular shape as shown in FIG. 3. Four, elongated, vertically extending legs 32 are connected at upper ends to the tubular members 31 and depend downward therefrom.

A vertically extending slide member 34 is slidably mounted on each of the vertical legs 32 as shown in FIG. 2. A vertical moving means is coupled to the four slide members 34 for vertically adjusting the position of the four slide members 34 and the camera housing attached to the vertical slide members 34 as described hereafter. A hollow tubular member 36 is centrally located between and connected to the vertical slide members 34 by braces 38. A ball nut 42 is mounted at one end of the hollow tubular member 36 and threadingly receives a ball screw 42 therethrough. The ball screw 42 extends from the ball nut 42 to a bi-directional output shaft of an electric drive motor 44 mounted on the upper frame of the movable rack 30. Energization of the drive motor 44, as described hereafter, will cause rotation of the ball screw 42 in one of two directions. Rotation of the ball screw 42 results in vertical movement of the tubular member 32 via the ball nut 40 in an upward or downward direction depending on the direction of rotation of the ball screw 42 to thereby adjust the vertical position of the tubular member 36 and the vertical slide members 34 connected thereto.

As shown in FIGS. 1–3, a horizontal drive means is mounted to the gantry 12 and connected to the upper frame of the movable rack 30. The horizontal drive means horizontally translates the movable rack 30 along two of the horizontal members 18 of the upper frame of the gantry 12. As shown in FIG. 2, slide rail engaging members 46, each having a longitudinal through bore, are spaced apart on opposite sides of the upper frame of the movable rack 30 and slidably receive the slide rails 22 attached to two of the upper frame members 18 of the gantry 12.

The horizontal drive means includes an electric drive motor 24 mounted at one end of the upper frame of the gantry 12. The drive motor 24 has a bi-directionally rotatable output shaft which engages a gear reducer 25. The gear reducer 25 drives a sprocket which engages a toothed drive belt 26 formed in a continuous loop. The opposite end of the drive belt 26 passes around a roller mounted on the upper frame. A plate 28 is fixed to the drive belt 26 and to the upper frame of the movable rack 30 to couple horizontal movement of the drive belt 26 to horizontal movement of the rack 30.

As shown in FIGS. 1–2, a frame 50 formed of interconnected tubular members is connected by brackets to one each the vertical slide members 34 and to the tubular member 36. A housing 52 is fixedly connected to the frame members 50 by brackets for vertical movement with movement of the vertical slide members 34 via the drive motor 44, the ball screw 42, the ball nut 40 and the centrally located tubular member 36 as described above.

Figure 8:
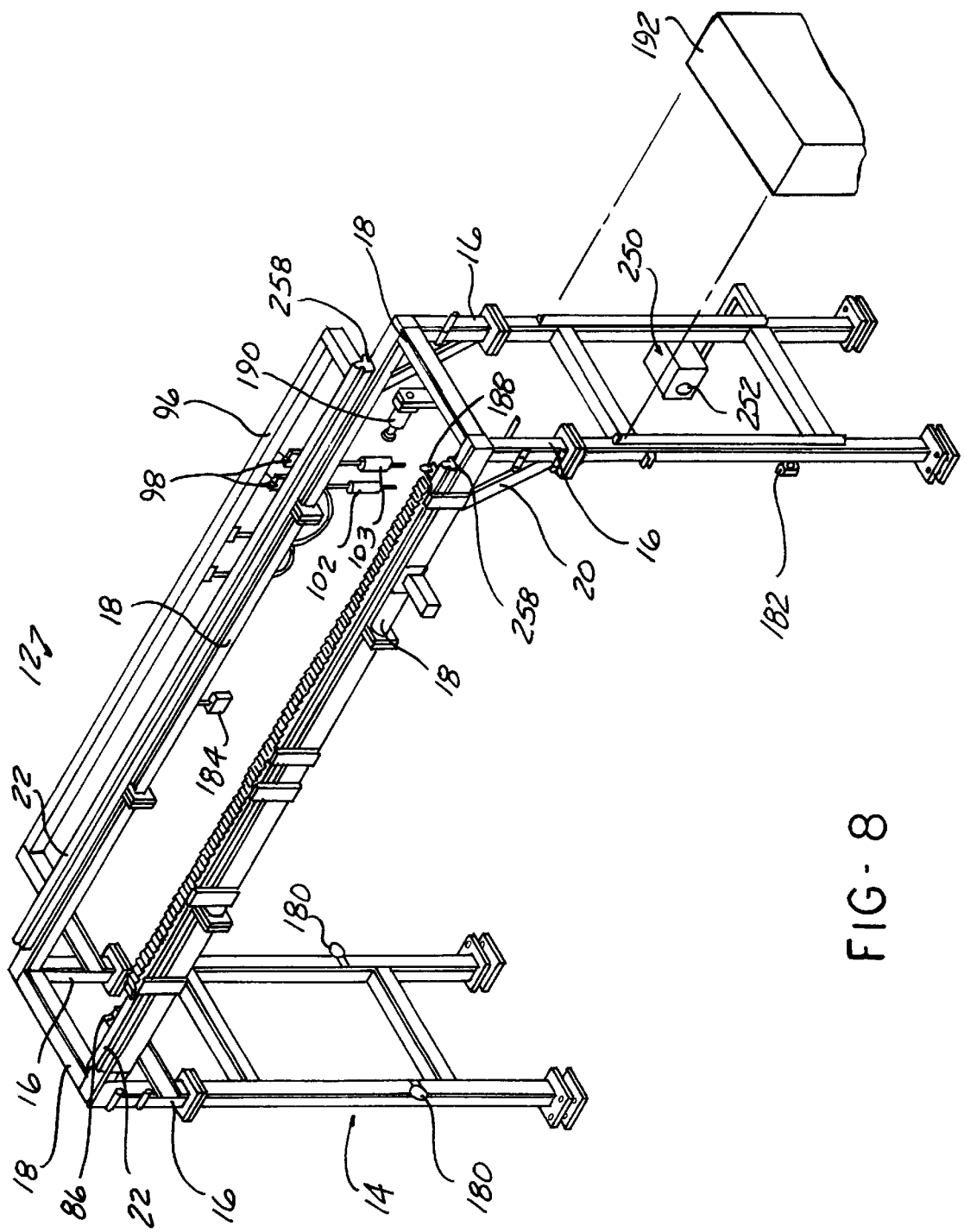
FIG. 8 is a perspective view of the gantry shown in FIG. 1; but with additional features.

The gantry 12, depicted as an alternate, but preferred embodiment in FIG. 8, is substantially identical to that described and shown above in FIGS. 1–3; but includes several modifications. A pair of safety light reflectors 180 and a corresponding pair of light emitters 182 are mounted on the legs 14 of the gantry 12 in aligned pairs to provide a safety curtain or envelope about the movement path of the camera housing 52 along the gantry 12.

A vehicle presence detector 184 is mounted on the gantry 12, such as on one of the horizontal members 18 as shown in FIG. 8. The vehicle presence detector 184, by example only, is in the form a light emitter which is aimed at a suitable light reflector mounted on the floor or other structure in front of the gantry 12. Passage of a vehicle through a light beam extending between the light emitter 184 and the associated light reflector will cause the light emitter 184 to provide a signal to the controller indicating that a vehicle has approached the headlight aiming apparatus 10.

Various overtravel limit switches are mounted on the gantry 12 for detecting the position of the camera moving means. Limit switches 186 and 188 are mounted at opposite ends of one of the horizontal members 18 for detecting extreme lateral positions of the camera moving means. A shock absorber 190 mounted on the gantry 12 to provide a cushion for return of the camera moving means to a home position.

A control panel 192 is mounted on the side of one pair of vertical legs 14 of the gantry 12.

A top rail 258 is mounted on each horizontal leg 18 and supports the circular cross-section slide rail 22. An additional rail 197 is mounted by legs to one horizontal leg 18 and extends above the leg 18 to support a gear rack 199.

Figure 9:
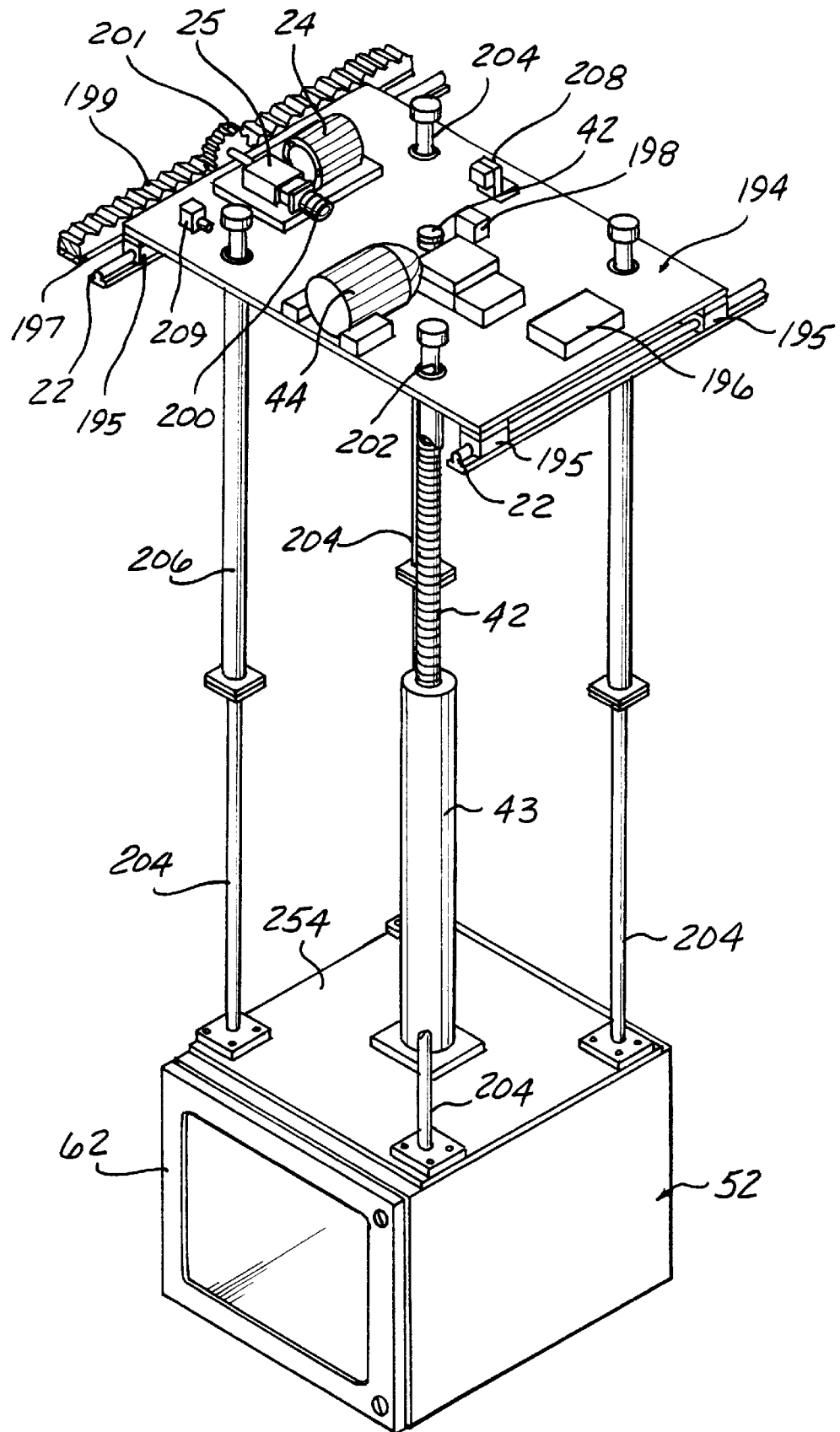
FIG. 9 is a perspective view showing the camera positioning means mounted on the gantry shown in FIG. 10.

A preferred embodiment of the camera moving means is shown in greater detail in FIG. 9. A plate or carriage 194 carries a pair of aligned pillow blocks 195 on each of two opposed sides which engage the tubular rods 24 mounted on the two horizontal rails attached to the top of the horizontal legs 18 of the gantry 12.

An enclosure or junction box 196 is mounted on the carriage 194 and housing electrical connections to the various electrical components mounted on the carriage 194 as described hereafter.

The horizontal drive motor 24 is mounted on the carriage 194 and has an output shaft connected to the gear reducer 25. An encoder 200 is coupled to the gear reducer 25 to provide horizontal position output signals or pulses. A pinion gear 201 is driven by the gear reducer 25 and engages the gear rack 199 mounted on the rail 197 affixed to one horizontal leg 18 of the gantry 12. Bi-directional rotation of the pinion gear 201 along the gear rack 199 drives the carriage 194 horizontally along the rails 22.

The output shaft of the vertical drive motor 44 is coupled to a threaded shaft or jack screw 42 which extends through a centrally located aperture in the carriage 194. An encoder 198 is coupled to the shaft 42 to provide position information relating to the linear position of the shaft 42 upon bi-directional energization of the vertical drive motor 44 as described above.

Figure 10:
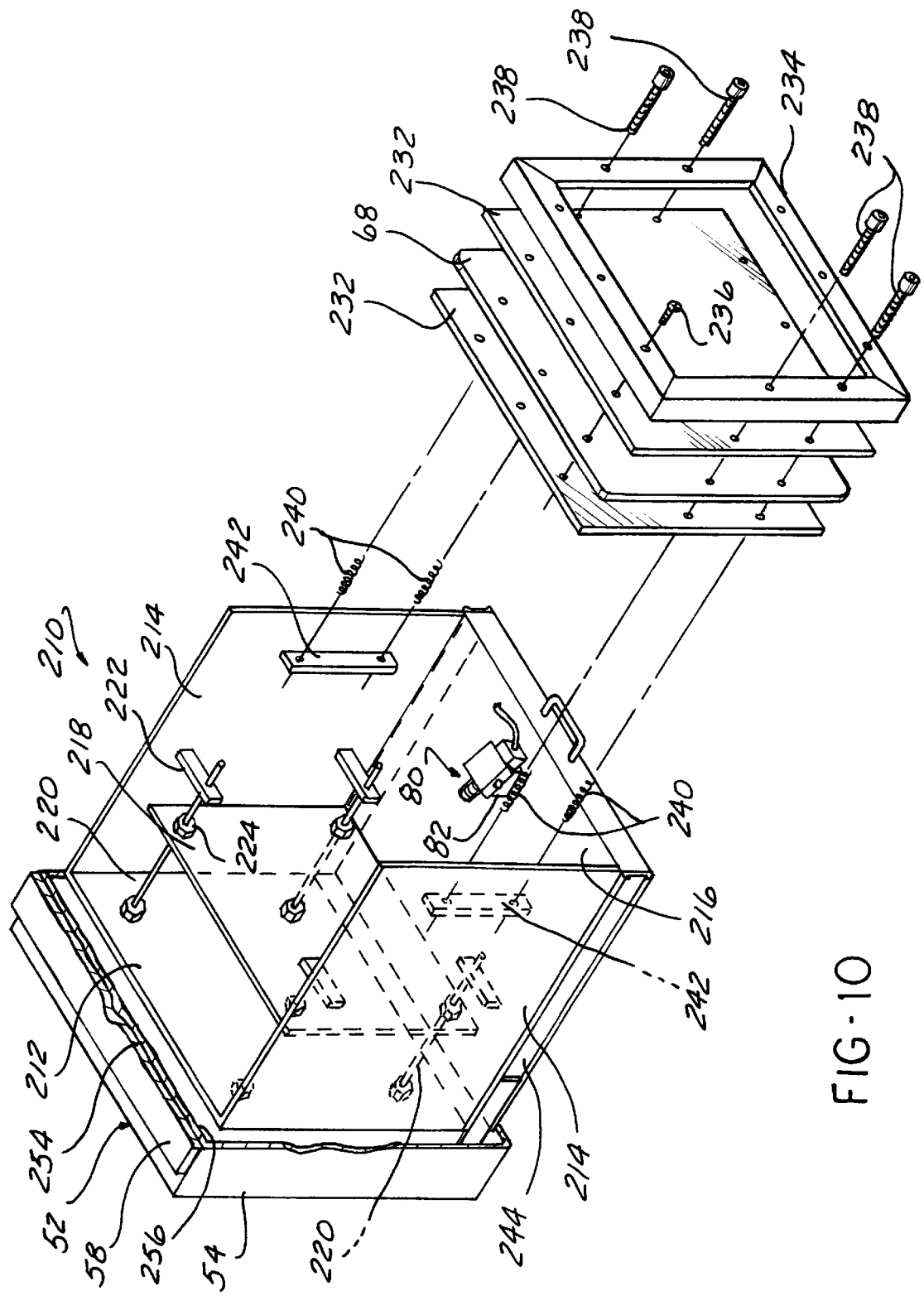
FIG. 10 is an exploded, perspective view of another embodiment of the camera housing of the present invention.

Four apertures, each denoted by reference number 202, are located near the corners of the carriage 194. A guide rod 204 is extensible through each aperture 202 as shown in FIGS. 9 and 10. The guide rods 204 are fixedly mounted on the housing 52 and extend through hollow guide cylinders or sleeves 206 fixedly mounted on and extending from the bottom surface of the carriage 194 and aligned with one aperture 202 in the carriage 194. In this manner, rotation of the threaded shaft 42 by the vertical drive motor 44 causes the threaded shaft 42 to screw into or out of the jack cylinder 43 mounted on the housing 52 which results in vertical movement of the housing 52.

As shown in FIG. 9, a detector 208, such as a proximity switch, is mounted on the carriage 194 adjacent one guide rod 204. The detector 208 is positioned to detect the absence of the end of the adjacent guide rod 204 for an indication of vertical downward overtravel of the housing 52.

Another detector, such as a limit switch 209, is mounted on the carriage 194 and positioned to detect an end cap on the end of rod 204 when the rod 204 and attached housing 52 is at a vertical home position.

Figure 4:
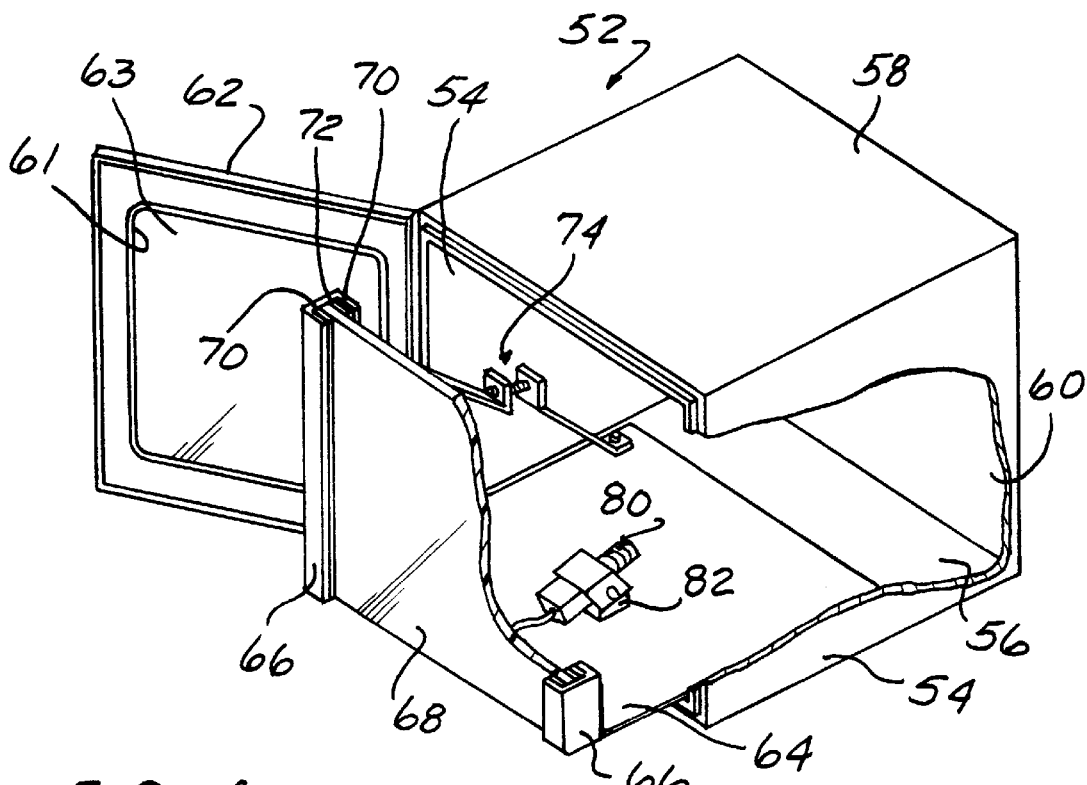
FIG. 4 is a partially broken away, perspective view of the camera housing shown in FIGS. 1 and 2.

As shown in greater detail in one embodiment in FIG. 4, the housing 52 comprises a generally four-sided enclosure having a pair of spaced side walls 54, a bottom wall 56, a top wall 58, and a rear or back wall 60. A door or front cover 62 is pivotally connected, such as by a hinge, to one edge of one of the side walls 54 and is lockingly engagable with the opposed side wall 54 to close the interior of the housing 52; while at the same time allowing access to the components mounted within the interior of the housing 52. An aperture 61 is formed in the door 62 and receives a transparent cover plate 63. A bottom slide plate 64 is disposed within the housing 52 and slidingly overlays the bottom wall 56 of the housing 52.

A pair of generally U-shaped channel members 66 are mounted at one end of the bottom slide plate 64 and extend vertically therefrom. Although only one is shown in FIG. 4, a pair of adjustable support assemblies 74 fixedly connect each channel member 66 to one edge of the bottom slide plate 64. The channel members 66 support a focusing lens 68, such as a flat FRESNEL lens. Resilient pads 70 and a spacer 72 are mounted in each channel member 66 for resiliently supporting the lens 68 in the channel members 66.

SAE headlight aiming tests require that the headlight beam be imaged on a surface spaced 25 feet from the vehicle headlight. The focal length of the lens 68 is chosen so that a headlight beam image is formed on the back wall 60 of the housing 52 which is comparable to an image formed 25 feet from the vehicle headlight.

An image sensing means or camera 80 is secured to the bottom slide plate 64 via a mount 82. The camera 80 may be any type of camera for sensing the image reflected off of the flat black back wall 60 of the housing 52. Preferably, the camera 80 is a CCD type camera which has a plurality of light sensor cells arranged in a 512×480 pixel matrix. By example only, the camera 80 may be a Panasonic camera, model number WV-BP500. A six millimeter F12 lens is mounted on the camera 80.

FIG. 10 depicts an alternate embodiment of the camera housing 52. The housing 52 is substantially identical to the housing 52 described above and shown in FIG. 4 in that it includes a pair of spaced side walls 54, the top wall 58, a bottom wall, and a rear or back wall. A door or front cover 62, shown in FIG. 4, is pivotally connected to one end of one of the side walls 54 and is lockingly engagable with the housing 52 by means of suitable latches mounted on the front door or cover. The front door includes an aperture 61 which receives a transparent cover plate 63 as shown in FIG. 4.

In the embodiment shown in FIGS. 8, 9 and 10, an external mounting plate 254 is mounted on the top wall 58 of the housing and receives mounting pads at the ends of the guide rods 204 and jack cylinder 43. An internal mounting plate 256 is mounted on an inner surface of the top wall 58 of the housing 52.

The camera slide tray 210 is slidably mounted in the housing 52 by a two-part slide including slide element mounted on the slide tray 210 and a mating element, not shown, mounted on the housing 52. The slide tray 210 includes a back wall 212, a pair of spaced side walls 214, and a bottom wall 216. The camera slide tray 210 is sized to slidably fit within the housing 52 as shown in FIG. 10.

The camera 80 is mounted on the bottom wall 216 of the slide tray 210. A screen or reflective surface 218 is adjustably mounted within the slide tray 210. Adjustable mounting means includes a plurality of threaded rods 220 which fixedly extend from the back wall 212 through apertures in the screen 218 and bores in a plurality of mounting blocks 222. A threaded fastener, such as a nut 224, is mounted about each rod 220 and threaded into engagement with the front surface of the screen 218 to fix the position of the screen 218 relative to the camera 80. The four threaded rods 220, the fasteners 224 and the mounting blocks 222 enable the vertical and horizontal angular position of the screen 218 to be adjusted relative to the camera 80 by extension and retraction of the rods 220 relative to the back wall 212.

The focusing lens 68 is part of a lens package or assembly 230. As described above, the focusing lens 68 is preferably a flat FRESNEL lens. The lens 68 is disposed between two protective, transparent sheets 232, which are preferably formed of a strong material, such as LEXAN. A frame 234 formed of angle iron has a plurality of apertures spaced along the top and bottom edges for receiving threaded fasteners 236 which extend through the apertures in the frame 234, and each of the protective sheets 232 and the lens 68, for holding the various elements of the lens assembly 230 in an assembled relationship within the frame 234.

Lens frame mounting and adjustment means are provided for mounting the lens assembly 230 in the slide tray 210; while providing vertical and horizontal adjustment of the lens 68 relative to the screen 218. The adjustment means includes elongated fasteners 238, such as hex head bolts, which extend through apertures in the vertical side legs of the frame 234 and the sides of each of the protective plates 232 and the lens 68. A biasing means, such as a compression spring 240, is disposed about the threaded shank of each fastener 238 between the innermost protective sheet 232 and a pair of lens mounting blocks 242. The lens mounting blocks 242 are fixedly secured, such as by welding or fasteners, to the inner surfaces of the side walls 214 of the slide tray 210 and include a pair of spaced bores which slidably receive the shanks of the threaded fasteners 238. Suitable nuts, not shown, are mounted about the shanks of the fasteners 238 after the shanks pass through the lens mounting blocks 242. In this manner, vertical and horizontal adjustments in the position of the lens 68 may be attained by rotating the hex head of any of the fasteners 238.

Also mounted on the vertical tubular members 32 shown in FIG. 1 is a control panel 86 having a touch screen LCD display 88 and a plurality of manual pushbuttons or selector switches 90 for providing various inputs to the control means described hereafter. The display 88 displays various menus or status information to an operator as well as providing touch input selections.

Also mounted on one of the vertical legs 14 of the gantry 12 is a calibration means for calibrating the housing 52 after each aiming operation. The calibration means includes a light source, such as a vehicle headlight 92, which is attached by a mounting bracket 94 to one of the vertical legs 14 of the gantry 12. Additional details concerning the calibration features of the present invention will be described hereafter.

Alternately, as shown in FIG. 8, the calibration means is formed of a laser mounted in a housing 250 attached to a frame extending from one of the vertical legs 14 of the gantry 12. Any suitable laser may be used, such as a Metrologic laser, for example. The laser is aimed through an aperture 252 in the housing 250 and is aligned with the lens 68 in the camera housing 52 when the camera housing 52 is at the calibration position.

As shown in FIG. 2, a screwdriver mounting frame structure 96 is affixed to one of the horizontal tubular members 18 of the gantry frame. The frame structure 96 extends along the length of the gantry 12 and supports one or two cable reels 98. A cable 100 extends from each cable reel 98 and is connected to an electric motor driven screwdriver 102 which has a rotatable bit 104 mounted therein. The screwdriver 102 may be any conventional power screwdriver, such as one sold by DeSoutter.

Figure 6:
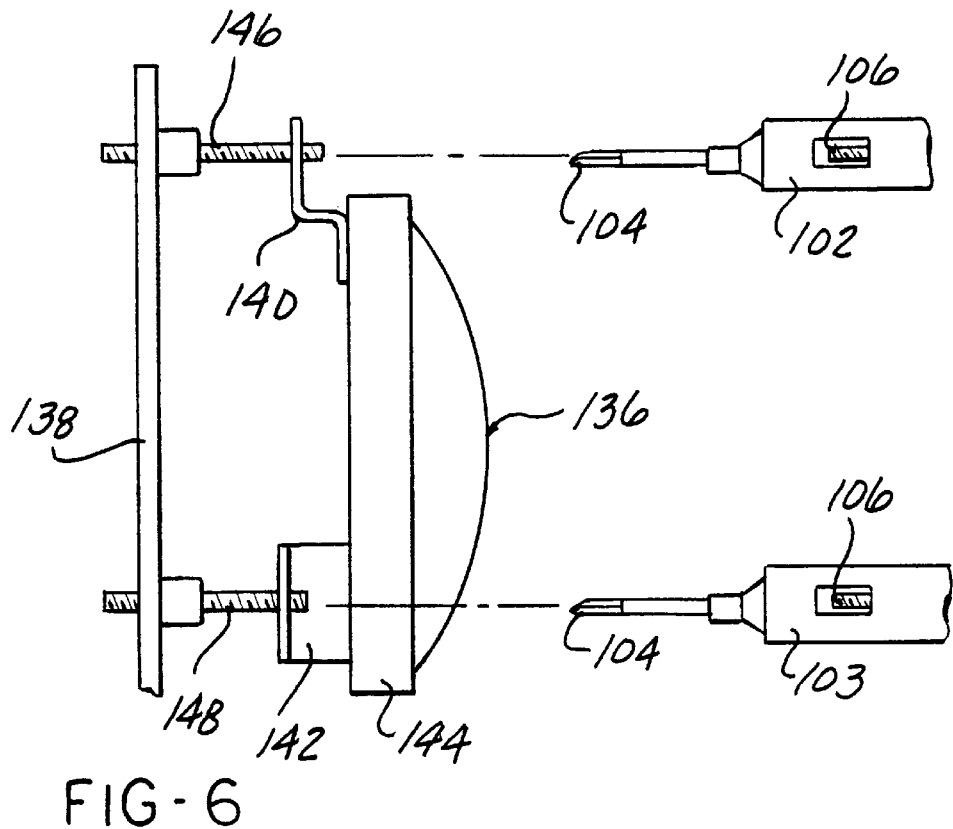
FIG. 6 is a side elevational view of a headlight mounting and adjustment structure.

Only one screwdriver 102 is shown in FIG. 2. However, it will be understood that two screwdrivers 102 and 103, as shown in FIGS. 6 and 8, are typically mounted via separate cables 100 and reels 98 to the frame 96 and are slidingly movable along the frame 96 to adjust a vehicle headlight in both X and Y axes.

The screwdriver 102 or screwdriver 103 has a bi-directionally rotatable output shaft, with the polarity of the voltage applied to the drive motor of the screwdriver 102 and 103 determining the direction of rotation of the output shaft and the bit 104 connected thereto.

Figure 5:
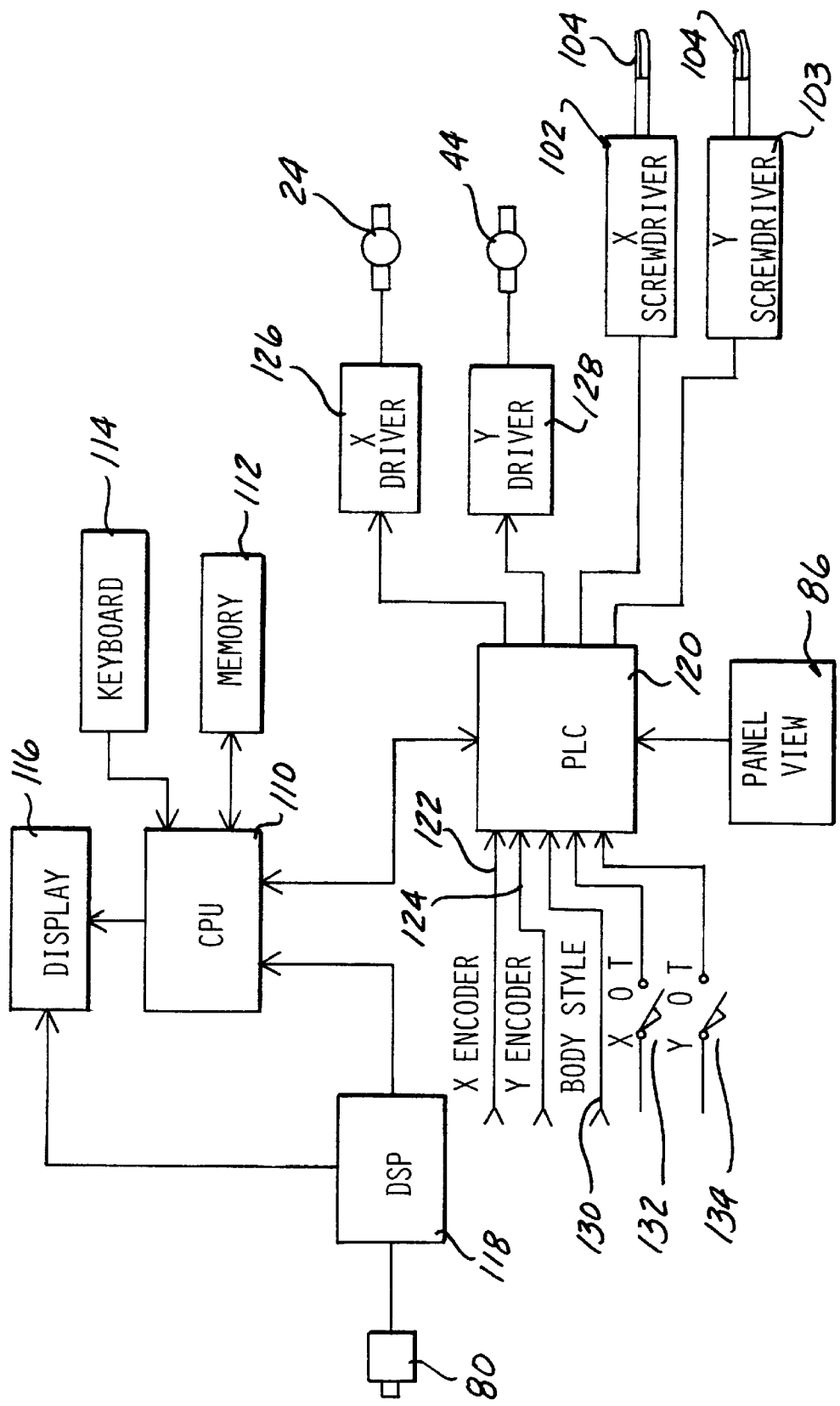
FIG. 5 is a block diagram of the control means employed with the apparatus shown in the preceding Figures.

Referring now to FIG. 5, there is depicted a control means mounted separate from the gantry 12 which controls the operation of vehicle headlight aiming apparatus 10.

The control means includes a controller, such as a microprocessor, mini computer, etc., having a central processing unit (CPU) 110 which executes a control program stored in a memory 112. By example only, the CPU 110 is a 66 MHz 80486 processor. A keyboard 114 is connected to the CPU 110 for inputting various information to the CPU 110. A display 116 is also connected to the CPU 110 for displaying various output data.

A digital signal processor 118 is also input to the CPU 110 and, also, controls the display 116 for displaying the digitized image output from the camera 80. By example, the digital signal processor 118 is an IM-LC processor made by Matrox, Dorval, Quebec, Canada and acts as a frame grabber for the output of the camera 80.

Although the CPU 110 is capable of directly controlling the operation of the screwdrivers 102 and 103 as well as the X and Y drive motors 24 and 44, in an exemplary embodiment, a programmable logic controller or PLC 120 is connected in data communication with the CPU 110. By example only, the PLC may be an Allen Bradley PLC model 5/30 which is connected to the CPU 110 by a conventional data highway or bus utilizing Allen Bradley data communication protocol. The outputs of the control panel 86; i.e., signals from a mode selector switch, start and stop pushbuttons, or other operator input, are input to the PLC 120. The PLC 120 is response to various inputs executes a stored control program to activate various outputs as described hereafter.

Further inputs to the PLC 120 include signals 122 and 124 which are respectively output from the horizontal encoder 200 connected to the X axis drive motor 24 and the vertical encoder 198 connected to the Y axis drive motor 44. Any conventional encoder may be employed which generates a pulse for each predetermined amount of rotation of the motor output shaft to indicate the position of the movable member driven by the respective motors 24 and 44. The encoder outputs 122 and 124 are input to the PLC 120 and used by the PLC 120 when executing its control program to generate signals to X and Y drivers 126 and 128 respectively connected to the X and Y drive motors 24 and 44. By example only, the X and Y drivers 126 and 128 may be variable frequency drives, such as a variable frequency drive model number 1305 sold by Allen Bradley.

Also input to the PLC 120 is an input signal labeled "BODY STYLE" which may be a signal indicating the particular vehicle style which is undergoing headlight aiming. As several different vehicle styles containing different headlight arrangements and/or headlight positions may be tested by a single headlight aiming apparatus 10, the "BODY STYLE" signal 130 provides an indication of which body style is undergoing test.

Finally, an X axis over travel limit switch 132 and a Y axis over travel limit switch 134, shown in FIG. 5, are mounted on the gantry 12 and the rack 30 to indicate an overtravel of the horizontal position of the mounting rack 30 and the vertical slide members 34.

The apparatus 10 is capable of different modes of operation which may be selected by the operator. Such modes include "teach or manual", "run" and "auto". In the teach or manual mode, as selected via the display screen 88 or one of the selector switches or pushbuttons 90 on the control panel 86, the CPU 110 enters a teach mode in which the pushbuttons 90 on the control panel 86 may be employed to activate the drive motors 24 and 44 to move the mounting rack 30 to the desired vertical and horizontal position with respect to a vehicle headlight disposed adjacent to the gantry 12. It will be understood that a conventional vehicle centering mechanism will typically be employed to center the vehicle with respect to the gantry 12 and to precisely align or square the vehicle headlight to the lens 68 in the housing 52.

As shown in FIG. 6, a conventional vehicle headlight 136 is adjustably mounted in a support structure or panel 138 on the vehicle. A pair of flanges 140 and 142 extend from a head lamp mounting ring 144 which surrounds the headlight 136. An X axis adjustment screw 146 and a Y axis adjustment screw 148 extend through the support structure or panel 138 and respectively engage the flanges 140 and 142 on the headlight mounting ring 144. Rotation of the screws 146 and 148 via the screwdrivers 102 and 103 will cause the position of the respective mounting flanges 140 and 142 to be adjusted with respect to the fixed vehicle support structure 138 thereby changing the orientation of the headlight 136 along the X and Y axes to center or align the aim of the headlight 136 according to an established headlight aiming standard, such as SAE, European or Japan standards.

Continuing with the teach mode, when a test headlight or a vehicle having a properly aimed headlight is positioned adjacent the gantry 12, the mounting rack 30 will be manually moved in the X and Y directions until the housing 52 is aligned with the headlight 36. The CPU 110 then receives a image from the camera 80 of the light beam image reflected off of the back wall 60 of the housing 50 and into the camera 80. The CPU 110 digitizes the image on a pixel by pixel basis and converts each pixel to a grayscale intensity value. Since the camera 80 in an exemplary embodiment of the present invention has a pixel matrix of 512×480 pixels arranged in rows and columns, respectively, the CPU 110 stores in the memory 112 a digitized grayscale image of each pixel of the test headlight. The CPU 110 is capable of recognizing this stored image as the standard or model image for the particular style headlight and the particular mounting position of the headlight on a vehicle.

This teach process is repeated for each headlight position on the vehicle, such as for all high beam and low beam headlights as well as any optional fog lights. The CPU 110 stores a model image for each headlight and each mounting position of each headlight in the memory 112.

This teach process will also be repeated for all of the different body styles of vehicles which may be tested by a single aiming apparatus 10.

Also during the teach process, the X and Y axis positions of the housing 52 as output by the encoders 198 and 200 coupled to each of the drive motors 24 and 44 will be stored in the memory of the PLC 120. This enables the PLC 120 to move the housing 52 to the desired headlight position for each headlight on a vehicle or vehicle style undergoing aiming.

After all of the model headlight aiming model images are stored in the memory 112, the apparatus 10 can be placed in either "run" or "auto" mode. The "run" mode represents a single headlight aiming test; while the "auto" mode represents a continuous operation of repeated headlight aiming tests for a single vehicle or each of a number of successive vehicles move into proximity with the apparatus 10.

As "run" and "auto" modes are similar, the following description will be for the operation of the apparatus 10 in aiming a single headlight in "run" mode. It will be understood that a similar process is executed by the apparatus 10 for each headlight on a vehicle in the "auto" mode.

Figure 7:
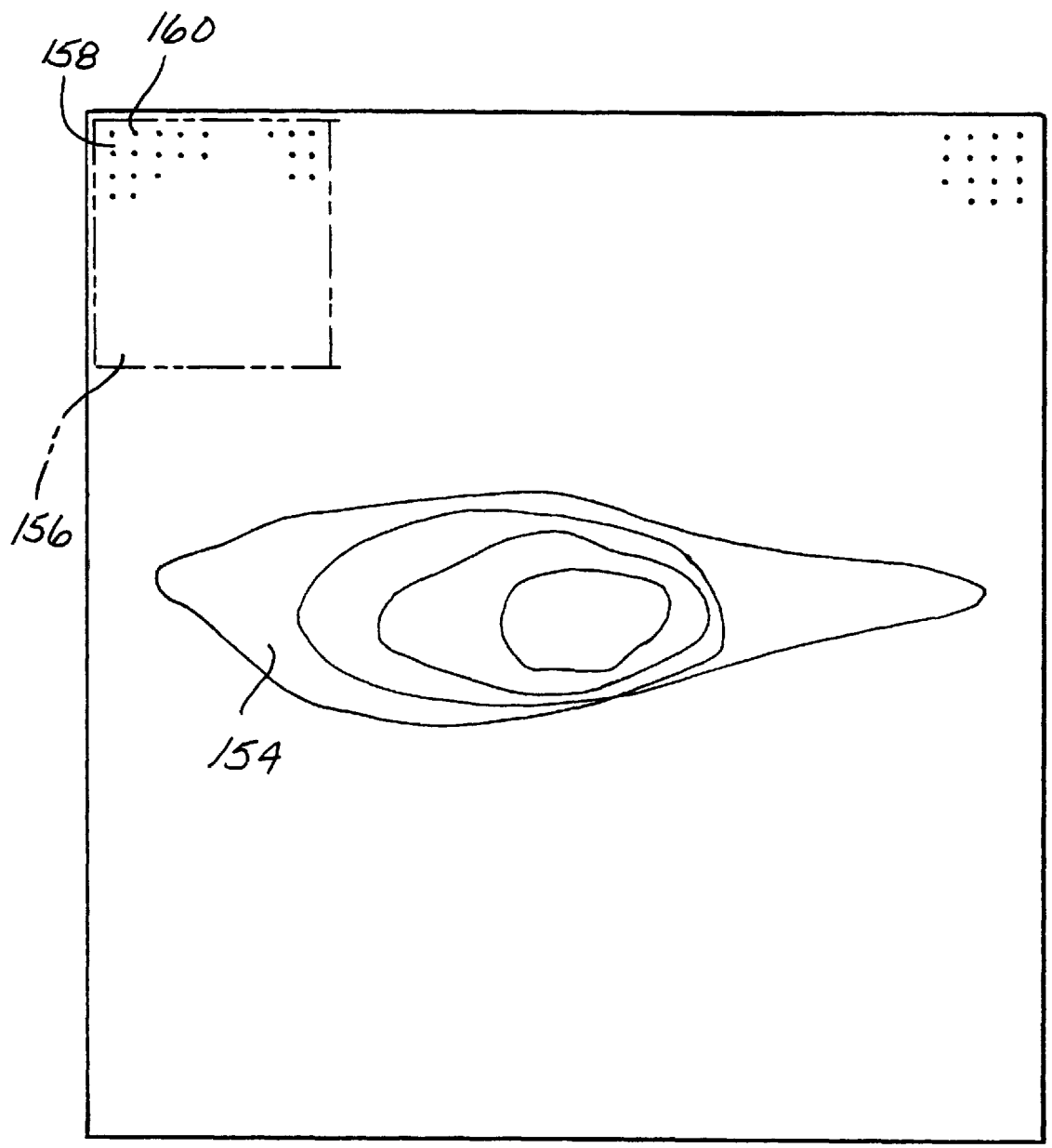
FIG. 7 is a pictorial representation of the headlight aiming process employed in the apparatus of the present invention.

In general, the CPU 110 executes a normalized grayscale correlation algorithm stored in the memory 112 to determine the best fit or correlation between the model image for a particular headlight and the actual image as sensed by the camera 80. This algorithm is set forth below:

$$r = \frac{N \sum_{i=1}^{i=N} I_i M_i - \sum_{i=1}^{i=N} I_i \sum_{i=1}^{i=N} M_i}{\sqrt{\left[N \sum_{i=1}^{i=N} I_i^2 - \left(\sum_{i=1}^{i=N} I_i\right)^2\right]\left[N \sum_{i=1}^{i=N} M_i^2 - \left(\sum_{i=1}^{i=N} M_i\right)^2\right]}}$$

where:
 I=grayscale pixel intensity
 N=total number of pixels in model (i.e., 512×480)
 Ii=image pixel number
 Mi=model pixel number The CPU 110 forms a sample window of n×n pixels. By way of example, the sample window is 128×128 pixels as shown by the sample window 156 in FIG. 7. For clarity in understanding the present invention, the sample window 156 is shown superimposed over the digitized grayscale image of the reflected headlight beam from the headlight 136 as would be displayed on the display 116.

In executing the algorithm, the CPU 110 multiplies the grayscale intensity of the first pixel 158 as digitized from the actual reflected light beam from the headlight 136 with the corresponding model pixel intensity. This process is repeated for each pixel in the sample window 156 and the corresponding pixels in a similarly formed model image. Each of the products are then summed to provide a correlation or match value for the window 156. Next, the CPU 110 forms a second window which is offset from the first window by one pixel. Thus, in the second sample window, the first pixel is pixel 160 shown in FIG. 7. The first row of pixels in the second sample window will extend one pixel beyond that of the first sample window 156. Multiplication of the grayscale intensity of each sample pixel and the corresponding model pixel is then performed, with the products summed to provide a correlation value for the second window.

This process is repeated for successive windows starting at each of the pixels in the first row of pixels before a window is formed starting with the first pixel in the second row of pixels. After all of the pixels in the rows and columns of the sample and model pixel matrix have been utilized by the algorithm, the CPU 110 determines the highest correlation value between the sample windows and the corresponding model windows, which highest correlation value indicates the closest match between the sample windows and the model windows. Of course, in the example above, as the sample window 156 is outside of the actual light image 154, all of the products and summations thereof will be zero. However, specific numeric values will be generated when the sample windows contain pixels in the light image 154.

Since the center of each sample window, such as sample window 156, can be determined by the CPU 110, the center of the window having the highest correlation value to the model is then determined by the CPU 110. The CPU 110 then calculates the distance along the X and Y axes for the window on the model image which indicates a proper aiming position of the headlight 136. When the differences between the X and Y dimensions in the sample window and the corresponding model image window are calculated, the CPU 110 outputs a signal to the PLC 120 which in turn supplies a voltage to the X and Y screwdrivers 102 and 103 causing rotation of the bits 104 of the screwdrivers 102 and 103 in a particular direction of rotation depending upon the polarity of the voltage applied to the drive motors in each screwdriver 102 and 103. As soon as the operator activates the on pushbutton 106 in each screwdriver 102 and 103, as shown in FIG. 6, after engaging the bits 104 with the respective adjustment screws 146 and 148, the screwdrivers 102 and 103 will cause rotation of the headlight adjustment screws 146 and 148.

The CPU 110 continues to re-execute the algorithm to determine the subsequent sample windows having the highest correlation value or match with the model. As this is done while the screwdrivers 102 and 103 are rotating the adjustment screws 146 and 148, the difference between the center of the sample window having the highest correlation value and the center of the model image will progressively decrease until the center of the sample window matches the corresponding position of the model image thereby indicating a properly aimed headlight.

If, after the screwdrivers 102 and 103 start to rotate the adjustment screws 146 and 148, the difference between the actual position of the center of the headlight and the center of the model image increases, the CPU 110 will generate a signal to the PLC 120 which will immediately reverse the polarity of the voltage applied to the screwdrivers 102 and 103 causing rotation of the bits 104 in the opposite direction.

After the headlight 136 is properly aimed to the selected standard, the PLC 120 outputs a signal to the control panel 86 indicating that the aiming sequence has been completed and deactivates the screwdrivers 102 and 103. The operator then removes the screwdrivers 102 and 103 from the adjustment screws 146 and 148 and proceeds to the next headlight or the next vehicle if all the headlights on a particular vehicle have been correctly aimed.

After the headlight aiming operation has been completed, the PLC 120 generates signals to the drive motors 24 and 44 to move the rack 30 and the housing 52 to the home position shown in FIG. 1. In this position, the housing 52 is aligned with the calibration light 92. The CPU 110 then reexecutes the algorithm, as described above, to verify that the housing 52 and the camera 80 are in the normal mounting position on the rack 30.

In summary, the headlight aiming apparatus and method of the present invention provides a highly accurate headlight aiming apparatus and method which can be easily integrated into a vehicle production line. The apparatus is usable with many different style vehicle headlight configurations as well as with different aiming image standards.

What is claimed is:

1. An apparatus for aiming a vehicle headlight to a standard aiming image, the headlight mounted in an adjustable support, the headlight aiming apparatus comprising:

a housing alignable with the headlight;

means, mounted in the housing, for detecting the intensity of light emitted from the headlight and entering the housing;

a reflective surface in the housing;

means for focusing light emitted from the headlight onto the reflective surface, the light incident on the reflective surface reflecting to the light detecting means;

a stationary frame extending transverse to a longitudinal axis of the vehicle, the frame allowing passage of the vehicle therethrough after a headlight aiming operation; and means for mounting the housing on the frame for movement between a home position allowing passage of the vehicle through the frame and an aiming position during each headlight aiming operation.

2. The headlight aiming apparatus of claim 1 further comprising:

means for calibrating the position of the housing when the housing is at the home position.

3. The headlight aiming apparatus of claim 2 wherein the means for calibrating comprises:

an aimed headlight mounted at the home position of the housing.

4. The headlight aiming apparatus of claim 2 wherein the means for calibrating comprises:

a laser mounted at the home position of the housing.

5. The headlight aiming apparatus of claim 1 further comprising:

means for storing the coordinate positions of the aiming position of the housing; and means, responsive to the stored coordinates, for moving the housing from the home position to the aiming position.

6. The headlight aiming apparatus of claim 1 further comprising:

means for adjusting the relative position of a lens and the reflective surface to each other.

7. The headlight aiming apparatus of claim 6 wherein the adjusting means comprises:

a fixed lens support mounted in the housing;

means, engagable with the lens and the fixed lens support, for adjusting the distance of the lens relative to the fixed lens support.

8. The headlight apparatus of claim 7 further comprising:

a plurality of fixed lens support mounted in the housing, each fixed lens support disposed adjacent a peripheral portion of the lens;

a plurality of independently adjustable means engagable with each fixed lens support and spaced peripheral portions of the lens.

9. The headlight aiming apparatus of claim 8 wherein the adjusting means comprises:

a threaded rod extendable through the lens and into adjustable threading engagement with each fixed lens support.

10. The headlight aiming apparatus of claim 9 further comprising:

biasing means, disposed between each fixed lens support and the lens, for biasing the lens away from the fixed lens supports.

11. The headlight aiming apparatus of claim 6 wherein the adjusting means comprises:

a fixed reflective surface support mounted in the housing;

means, engagable with the reflective surface and the fixed reflective surface support, for adjusting the distance between the fixed reflective surface support and the reflective surface.

12. The aiming apparatus of claim 11 wherein the adjusting means comprises:

a threaded rod fixed to the housing and extending through a peripheral portion of the reflective surface and through the fixed reflective surface support;

a fastener engagable with the rod and disposed in registry with the reflective surface to fix the position of the reflective surface relative to the housing.

13. The headlight aiming apparatus of claim 1 wherein the means for mounting the housing on the frame comprises:

an electrical motor having a bi-directional rotatable output shaft;

a motor support movably carried on the frame;

translation means, mounted on the frame transverse to a longitudinal axis of the vehicle, for translating the motor support; and drive means, engagable with the output shaft of the motor and the translation means, for driving the motor support horizontally along the translation means.

14. The headlight aiming apparatus of claim 13 wherein the means for mounting the housing further comprises:

a vertical drive motor having a bi-directionally rotatable output shaft;

screw means, mounted on the support and extending from the support;

means for coupling the output shaft of the motor to the screw means; and receiver means, mounted on the housing and engagable with the screw means, for extending and retracting the housing relative to the support upon rotation of the screw means.

15. The headlight aiming apparatus of claim 14 further comprising:

guide means, carried on and extending between the housing and the support, for guiding the vertical displacement of the housing relative to the support.

16. The headlight aiming apparatus of claim 1 wherein the calibrating means comprises:

a light source mounted on the frame at the home position of the housing.

17. The headlight aiming apparatus of claim 14 further comprising:

encoder means, coupled to the electrical motor and the vertical drive motor, for generating output pulses during rotation of the output shaft of each motor; and control means, responsive to the output pulses of the encoder means, for controlling each motor to selectively position the drive means and the screw means.

18. The headlight aiming apparatus of claim 17 wherein the control means, in response to a stored program, automatically controls the movement of the housing relative to the frame between X-Y coordinates of the home position and the aiming position of the housing relative to the frame.

19. The headlight aiming apparatus of claim 1 further comprising:

detector means for detecting obstructions in a path of movement of the housing between the home position and the aiming position.

20. A method of aiming a vehicle headlight to a standard image pattern, the method comprising the steps of:

mounting a reflective surface in a housing;

mounting a focusing lens in the housing for focusing a light beam of a vehicle headlight onto a reflective surface;

stationarily mounting a frame transverse to a path of movement of a vehicle, the frame allowing the vehicle to pass therethrough after a headlight aiming operation; and mounting the housing on the frame for movement from a home position to a vehicle headlight aiming position.

21. The method of claim 20 further comprising the step of:

calibrating the position of the housing when the housing is in the home position.

22. The method of claim 20 further comprising the steps of:

storing the coordinate positions of the home position and the aiming positions of the housing; and automatically moving the housing from the home position to the aiming position and back to the home position after each headlight aiming operation when a vehicle is disposed adjacent to the frame.

* * * * *